G. C. KENNEDY.
AUXILIARY CARRYING MEANS FOR VEHICLES.
APPLICATION FILED NOV. 1, 1917.
1,292,478.
Patented Jan. 28, 1919.
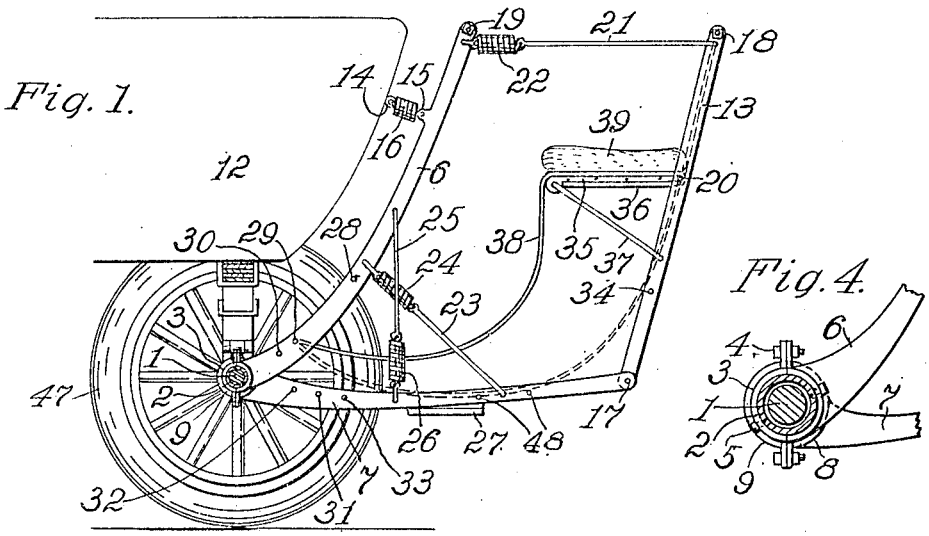
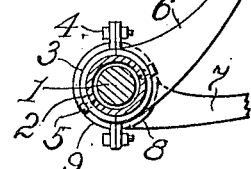
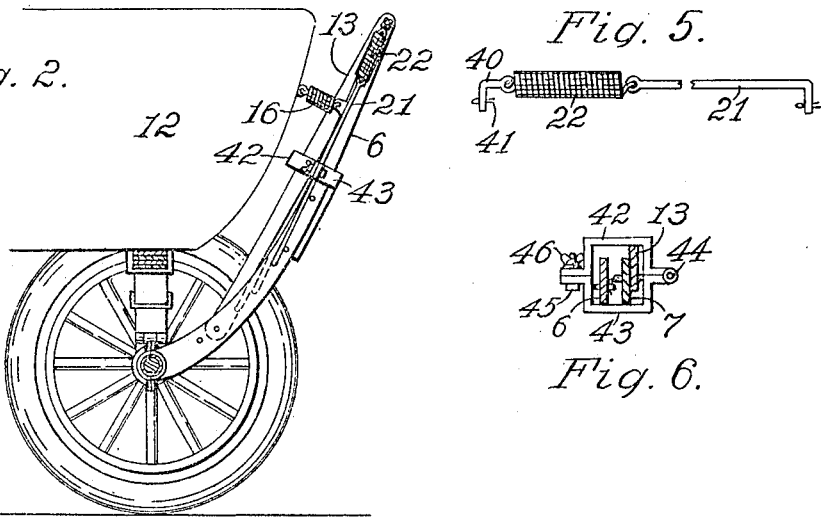
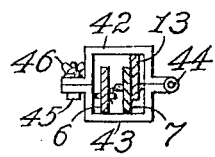
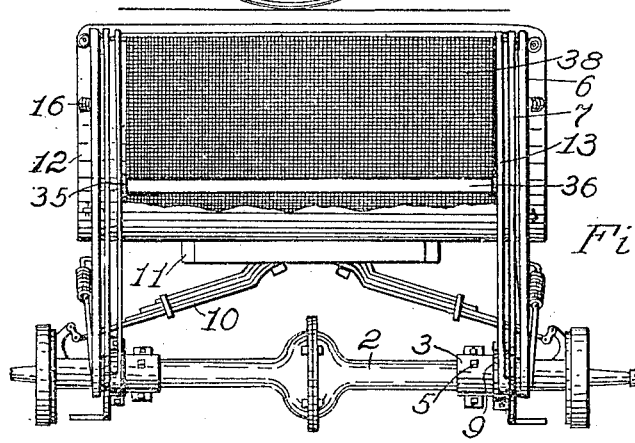
Inventor,
G. C. Kennedy.

UNITED STATES PATENT OFFICE.

GEORGE COLVIN KENNEDY, OF WATERLOO, IOWA.

AUXILIARY CARRYING MEANS FOR VEHICLES.

1,292,478.  Specification of Letters Patent.  Patented Jan. 28, 1919.

Application filed November 1, 1917. Serial No. 199,645,

*To all whom it may concern:*

Be it known that I, GEORGE COLVIN KENNEDY, a citizen of the United States of America, and resident of Waterloo, Blackhawk county, Iowa, have invented certain new and useful Improvements in Auxiliary Carrying Means for Vehicles, of which the following is a specification.

My invention relates to improvements in auxiliary carrying means for vehicles, and the objects of my improvements are, first, to supply demountable carrying means supported upon the rear part of a vehicle; second, to render this device collapsible into a small compass when not in use; third, to support said device adjustably and resiliently, and lastly, to combine in the structure of the device a foldable seat for a passenger.

These objects I have attained by the means which are hereinafter described and claimed, and which are illustrated in the accompanying drawings, in which Figure 1 is a side elevation of my auxiliary carrying means for vehicles mounted on the rear part of a vehicle in extended position; Fig. 2 is a like view, showing said device in its collapsed position; Fig. 3 is a rear elevation of said device, as mounted on a vehicle, the flexible apron being in part broken away; Fig. 4 is a detail cross-section of a vehicle axle and its housing with the parts of said device mounted thereon; Fig. 5 is a detail view of one of the resilient connecting-devices; and Fig. 6 is a detail view of the clamping-means for fastening the collapsed parts of the device together.

Similar numerals of reference denote corresponding parts throughout the several views.

My improved auxiliary carrying means may be removably mounted upon the rear part of any vehicle, such as the motor-car shown. The body 12 of said car and its frame 11 are mounted at the rear on a transverse spring 10 whose ends are secured to the extremities of the axle-housing 2, said housing receiving the differentially-connected axles 1, and being supported on the rear carrying-wheels 47.

Bipartite clamping-sleeves 3, having paired lugs secured together detachably by bolts 4, are mounted on the axle-housings, and secured fixedly thereto by means of set-screws 5. Fixed arms 6 project obliquely upwardly and rearwardly from the said clamping-sleeves as far as the top of the body 12. Coiled springs 16 are linked between eye-bolts 14 secured to the rear of the body 12 and eyes 15 in the fixed arms 6. Bipartite sleeves 9 are loosely mounted on said clamping-sleeves 2 to rock thereon, but may be mounted to rock on the axle-housing itself. These sleeves 9 have paired lugs detachably secured together by means of bolts. On said sleeves 9 are fixed arms 7, which project horizontally backward when the device is in its extended position.

Erect swing arms 13 are pivotally connected at 17 to the extremities of said swing arms 7, and when the device is extended project nearly vertically upwardly therefrom.

The fixed arms 6 have fixed connecting rods 28 and 19. The swing arms 13 are fixedly connected by means of transverse rods 20 and 18.

Referring to said Fig. 1, similar yieldable resilient linking-means are shown as connecting the arms 7 and 13 with the fixed arms 6. As shown in Fig. 5, each of these linking-means comprises end-bars 40 and 21 between which is connected a coiled spring 22, and the outer extremities of these end-bars are bent angularly to the same side to be received through orifices in the arms 6 and 13, and then secured removably by means of split-keys 41. The linking-connection 40, 22, 21 is positioned horizontally between said arms 6 and 13, connecting their upper ends. Other orifices are made in intermediate parts of the arms 6 and 7 to receive the bent over ends of the like resilient linking-means 25—26, vertically arranged, and 24—23 obliquely arranged.

As above described, the device is complete and sufficient as an auxiliary carrier for merchandise, baggage or other articles, which may be fastened thereto when extended, in any secure way. In order to provide for occasional carriage of a passenger, I have combined with the device a foldable seat. This consists of a transverse board or seat 36 with ends secured to arms 35, the latter swingingly mounted on the arms 13 on the rod 20. Detachable braces 37 are pivotally connected between the free ends of the arms 35 and orifices in the arms 13 and secured by means of split-keys. A flexible apron 38 made from any suitable material is mounted at its upper end on the transverse rod 18, and is passed over the seat 36 to which it may be fastened if desired, and depends downwardly and is then carried forwardly to have its other end mounted on the transverse rod 29. The apron, when the seat is folded, is positioned as shown by the dotted lines, where it affords a good support and mud-guard for any goods carried by the device. When the seat is extended, a passenger may mount to it by using a step 27 which projects laterally from the middle of the horizontal arm 7.

Referring to said Fig. 2, the device is shown therein collapsed. This is effected by disconnecting one end of each of said resilient linking-devices, folding the arms 13 within the arms 7, then folding the arms 7 between the fixed arms 6. The released ends of said linking-means may be secured in orifices in the arms as indicated at 28 and 30.

Other orifices 31, 32, 33 and 48 are provided in the arms 7, to be used in adjustably mounting the said linking-means thereto to vary the tensions of their springs, or change their direction of strain.

I have provided means for clamping the arms 6, 7 and 13 together firmly to prevent rattling or breakage when the device is collapsed. This consists of a pair of bipartite clamps 42—43 each having a common hinge 44, and each having paired lugs secured by means of a bolt 45 and a thumb-nut 46. However, any other convenient fastening-means may be used for this purpose.

The above described device is made of simple parts, and is easily extended or collapsed. The resilient connections 16 support the upper ends of the arms 6 and prevent the load suspended thereon from torsionally injuring the axle-housings or loosening the set-screws securing the clamping-sleeves. The resilient connections between the arms 6 and the arms 7 and 13 prevent shocks to the load from any direction. Modifications of the device are covered by the principles of this invention.

Having described my invention, what I claim as new, and desire to secure by Letters Patent, is:

1. A device of the character described, comprising arms rigidly mounted on the rear end of the running-gear of a vehicle, and members independently connected to said arms, to each other and to said running-gear forming together with the arms a skeleton-frame carrier.

2. A device of the character described, comprising arms fixedly mounted on a vehicle, and a plurality of movably connected members adjustably resiliently supported on said arms forming therewith a carrying receptacle.

3. A device of the character described, comprising arms fixedly mounted on part of a vehicle, resilient connections between said arms and another part of said vehicle, and members resiliently connected to and supported by said arms, forming therewith a carrying receptacle.

4. A device of the character described, comprising arms fixedly mounted on the rear axle-mounting of a vehicle, an elastic connection between said arms and the body of the vehicle, and elements connected to said axle-mounting and disconnectibly connected to said arms to combine therewith to be a carrying receptacle.

5. A device of the character described, comprising arms disconnectibly mounted on the rear axle-housing of a vehicle, elements movably mounted on said axle-housing, and linking-connections between said elements and said arms.

6. A device of the character described, comprising arms disconnectibly mounted on the rear axle-housing of a vehicle, members movably mounted on said axle-housing, and resilient linking-means between said members and said arms.

7. A device of the character described, comprising arms disconnectibly mounted on the rear axle-housing of a vehicle, members movably mounted on said axle-housing, elastic linking-connections between said members and said arms, and linking-connections between said arms and the body of the vehicle.

8. A device of the character described, comprising arms disconnectibly mounted on the rear axle-housing of a vehicle, members movably mounted on said axle-housing, elastic linking-connections between said members and said arms, and resilient linking-connections between said arms and the body of the vehicle.

9. A device of the character described, comprising arms disconnectibly mounted on the rear axle-housing of a vehicle, members swingingly mounted on said axle-housing, and disconnectible connections between said members and said arms.

10. A device of the character described, comprising arms disconnectibly mounted fixedly on the axle-housing of a vehicle, members swingingly mounted on said axle-housing, arms swingingly connected to said members, and disconnectible linking-means between said fixed arms and swinging arms.

11. A device of the character described, comprising arms disconnectibly fixedly mounted on the rear axle-housing of a vehicle, members swingingly mounted on said axle-housing, linking-connections between said members and said arms, arms swingingly mounted on said members, and linking-connections between said swinging and fixed arms.

12. A device of the character described, comprising arms fixedly mounted on the rear axle-housing of a vehicle, members swingingly mounted on said axle-housing, arms swingingly mounted on said members, and resilient connections disconnectibly linked between said fixed arms and said members, and between said fixed and swinging arms.

13. A device of the character described, comprising arms fixedly mounted on the rear axle-housing of a vehicle, members swingingly mounted on said axle-housing, arms swingingly mounted on said members, elastic linking-connections between said fixed and swinging arms, and between said fixed arms and said members, and disconnectible elastic linking-connections between said arms and the body of the vehicle.

14. A device of the character described, comprising arms fixedly mounted on the rear axle-housing of a vehicle, elements pivoted on the axle-housing, and a seat mounted on said elements.

15. A device of the character described, comprising arms fixedly mounted on the rear axle-housing of a vehicle, elements pivotally mounted on the axle-housing, and a seat resiliently supported on said elements.

16. A device of the character described, comprising arms fixedly mounted on the rear axle-housing of a vehicle, a seat foldably mounted on said arms, and resilient linking-connections between said seat, said arms and said vehicle.

17. A device of the character described, comprising arms fixedly mounted on the rear axle-housing of a vehicle, resilient connections between said arms and the body of the vehicle, a seat foldably supported on said arms, and a flexible apron connected between said seat and said arms.

18. A device of the character described, comprising arms fixedly connected to the rear part of a vehicle, elements movably connected between said arms and vehicle, a seat mounted on said elements, and a flexible cover for said seat extended to provide a foot-support also mounted on said elements.

19. A device of the character described, comprising supporting elements mounted on the rear part of a vehicle, a seat foldably supported on said supporting means, and resilient connections between the elements of said supporting-means and between said supporting-means and said vehicle.

20. A device of the character described, comprising arms fixedly mounted on the rear axle-housing of a vehicle, members swingingly mounted on said axle-housing, arms swingingly mounted on said members, and resilient linking-connections between said fixed arms, said members, and said swinging arms, and respectively extending from said fixed arms vertically, horizontally and obliquely.

21. A device of the character described, comprising supports fixedly mounted on a vehicle, elements movably connected to said supports, and resilient linking-connections between said supports and said elements, resiliently supporting said elements in different directions of tension.

22. A device of the character described, comprising supports mounted upon the rear of a vehicle, elements movably connected to said supports to form an extensible and collapsible crate, and a seat independently foldably connected to said elements.

23. A device of the character described, comprising supports mounted upon the rear of a vehicle, elements movably connected to said supports and to the vehicle to form a foldable container when extended, a seat independently foldably connected to said elements, and means for securing the elements in a collapsed condition.

24. A device of the character described, comprising supports disconnectibly mounted upon the rear of a vehicle and resiliently connected thereto, and folding elements resiliently connected to said supports.

25. A device of the character described, comprising supports mounted upon the rear of a vehicle, elements additionally mounted on the vehicle and movable relative to said supports, and resilient linking-means adjustably connected between said elements and said supports.

26. A device of the character described, comprising arms fixedly mounted upon a vehicle, elements additionally mounted on the vehicle and movably connected to and supported by said arms, and a flexible apron closing openings between said elements.

27. A device of the character described, comprising foldable carrying-means elastically mounted on a vehicle, and a flexible combined unitary bottom-closure and foot-support therefor.

Signed at Waterloo, Iowa, this 29th day of October, 1917.

GEORGE COLVIN KENNEDY.

Copies of this patent may be obtained for five cents each, by addressing the "Commissioner of Patents, Washington, D. C."